United States Patent [19]
Bauer

[11] 3,832,889
[45] Sept. 3, 1974

[54] ULTRA-SONIC WELD INSPECTION DEVICE
[75] Inventor: Edward F. Bauer, Rockaway, N.J.
[73] Assignee: The United States of America as represented by the Secretary of the Army, Washington, D.C.
[22] Filed: June 30, 1972
[21] Appl. No.: 267,876

[52] U.S. Cl. .......................... 73/71.5 U S, 310/8.7
[51] Int. Cl. ............................................. G01n 29/04
[58] Field of Search ........... 73/67.5 R, 67.6, 67.8 R, 73/67.8 S, 67.9, 71.5 U S; 310/8.3, 8.7

[56] References Cited
UNITED STATES PATENTS

| | | | |
|---|---|---|---|
| 2,448,352 | 8/1948 | Carlin | 73/71.5 U |
| 3,242,723 | 3/1966 | Evans | 73/71.5 U |
| 3,269,173 | 8/1966 | Von Ardenne | 73/67.9 |
| 3,420,097 | 1/1969 | Battermann et al. | 73/71.5 U |
| 3,741,004 | 6/1973 | Posakony | 73/67.8 S |

Primary Examiner—Richard C. Queisser
Assistant Examiner—John P. Beauchamp
Attorney, Agent, or Firm—Edward J. Kelly; Herbert Berl; A. Victor Erkkila

[57] ABSTRACT

This invention relates to an improved transducer for an ultrasonic weld inspection system of the type wherein the system utilizes a reflectoscope for electronically generating and detecting ultrasonic energy, a device for positioning the transducer adjacent said weld, a transducer for focusing said energy, a cable for electrically coupling the reflectoscope to the transducer to detect weld flaws. The improved transducer has a body sleeve slidably affixed to the transducer, a compliant end cap operatively disposed in the forward end of the body sleeve having an axially aligned collimating hole therein, a compliant liner within the body sleeve intermediate the end cap and the transducer, a fluid coupler intermediate the end cap and the transducer for coupling the ultrasonic energy directly into the weld in the form of a clean narrow collimated beam free from all stray and unwanted transmitted and reflected energy thereby permitting the return of an interface signal and first reflection signal to the detecting means which can be distinguished from any additionally returned signal that may be generated by a flaw or defect in the weld.

4 Claims, 3 Drawing Figures

PATENTED SEP 3 1974 3,832,889

ULTRA-SONIC WELD INSPECTION DEVICE

GOVERNMENTAL INTEREST

The invention described herein may be manufactured, used and licensed by or for the Government for governmental purposes without the payment to me of any royalty thereon.

BACKGROUND OF THE INVENTION

Various means have been used in the prior art for checking the soundness of lap-seam metal to metal welds. Prior art system utilizing X-rays to expose a photographic plate are generally expensive and hazardous. The X-ray equipment is itself relatively costly and the shielding to protect an operator from unwanted radiation exposure is both costly and space consuming. X-rays as an inspection tool is also time consuming in that a film has to be first exposed, then developed, and then visually inspected and interpreted to look for the weld flaw. Prior art weld inspection devices that used ultrasonic transducers or hydraphones in combination with a detection device were generally not satisfactory because they were not capable of producing a sufficiently narrow beam of energy. The prior art ultrasonic transducers produce spurious beams of energy which penetrate and reflect energy from the respective outerface surface and edges of the welded plate. The use of such transducers results in the detection instrument becoming saturated with false flaw detection signals. These false signals come from reflections from weld edges, material interface surfaces and adjacent separations in addition to the flaw or detect signal. The use of wide beam energy transducers in the above mentioned weld inspection system causes the defect signal to lose its definitiveness and therefore to be obscured.

SUMMARY OF THE INVENTION

This invention relates to an improved transducer used in conjunction with an ultrasonic generating and detecting instrument for weld inspection, such as the model 721 Reflectoscope as manufactured by Automation Ind. Inc. of Danbury, Conn. The instrument displays a verticle pulse trace on an oscilloscope tube which represents an interface signal and a first reflection signal. The distance between these two pulse traces represents the overall thickness of the two plates when lap-welded together. A discontinuity in the material caused by a defective weld will generate an additional pulse in the Reflectoscope which will appear as an additional trace intermediate the two aforementioned signals. Because of the narrow collimated beam of energy transmitted by the present improved transducer there is an absence of spurious signals, thereby resulting in a defect signal which can be clearly and distinctly seen.

One of the objects of this invention is to provide an improved ultrasonic transducer for use in a system to check the soundness of metal lap welds.

Another object of this invention is to enable an improved transducer to deliver a very narrow beam of ultrasonic energy to a metal lap seam weld being inspected.

Another object of this invention is to insure the use of a weld inspection system which is both more economical and faster to use than prior art X-ray inspection systems.

Another object of this invention is to provide simplified ultrasonic transducer inspection system wherein a collimated energy wave can be directed with precision at a weld area being inspected and wherein the flaw detection means permits an observer or automated equipment to readily differentiate between good and bad welds.

For a better understanding of the present invention, together with other and further objects, reference is made to the following description taken in connection with the accompanying drawings.

BRIEF DESCRIPTION OF THE DRAWINGS

Throughout the following description like reference numerals are used to denote like parts of the drawing.

DESCRIPTION OF THE PREFERRED EMBODIMENTS

Figure 1:
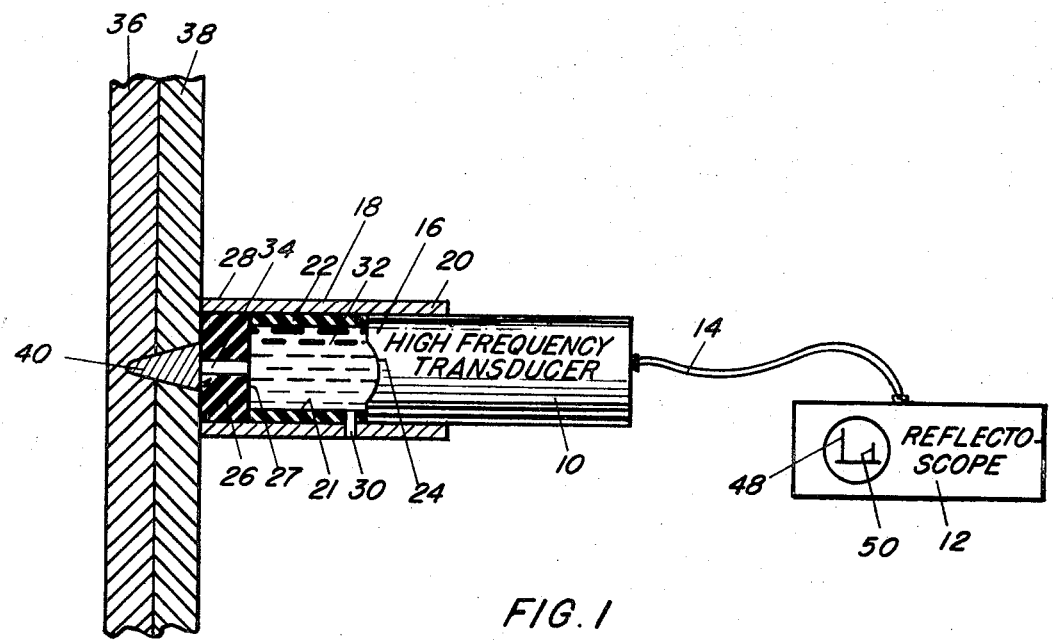
FIG. 1 is a partial cross-sectional view of the weld material being inspected and the improved transducer immediately adjacent thereto, a schematic view of a reflectoscope connected to the input-output terminals of the transducer.

Referring now to FIG. 1 a short focus high frequency transducer 10 such as or similar to the device manufactured by Automation Industries, Inc., Danbury, Conn. 06810, Model No. 57A2753, has its input-output terminals electrically connected to a reflectoscope 12, such as or similar to the ultrasonic transmitting receiving device, Model No. 721 as manufactured by Automation Industries Inc., by a coaxial connection cable 14. The transducer forward end 16 has a hollow cylindrical aluminum body sleeve 18 slidably affixed thereto at the body sleeve upon rear end 20. A small diameter hollow cylindrical rubber liner 22, made of soft or spongy but not porous material, is positioned within the sleeve 18 to absorb all spurious ultrasonic signals transmitted from the transducer emitting head lens 24 or reflected from the rubber end cap 26 fixedly attached to the sleeve forward open end 28. A small vent hole 30 passes through the sleeve 18 and the rubber liner 22. The vent 30 facilitates the escape of air bubbles that may be entrapped within the liquid coupler 32 or intermediate the end cap 26 and the transducer forward end 16. A small collimating bore 34 is axially aligned in the end cap 26. A section of two cylindrical materials butt welded together is shown by numerals 36 and 38. The weld 40 to be inspected is aligned with the collimating bore 34. The diameter of collimating bore 34 is made smaller than the smallest width of the weld in order to concentrate the ultrasonic energy beam within the weld area 40 only. The ratio of the length of the collimating bore 34 to its diameter is approximately 1.5 to 1 so that the bore will have a proper collimating effect.

Figure 2:
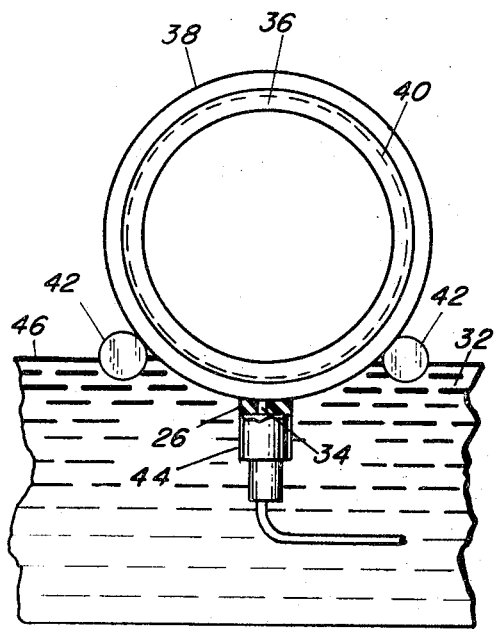
FIG. 2 is an end view of two concentrically positioned cylinders which have been circumferentially electron beam welded and positioned in a fluid medium upon rollers showing how the transducer is operatively positioned in relation thereto so that the weld may be inspected.

FIG. 2 shows how the improved ultrasonic transducer assembly 44 is used to inspect the integrity of the weld 40 on two cylinders 36 and 38 that were shrunk fitted and peripherally electron beam welded together. The two cylinders 36 and 38 rest on rollers 42 in such manner that a portion of the peripheral weld is submerged in a liquid coupler fluid 32, such as water, so that the cylinder weld 40 may be rotatably held immediately adjacent to the submerged end cap 26. The liquid level 46 is maintained just high enough for good coupling.

Figure 3:
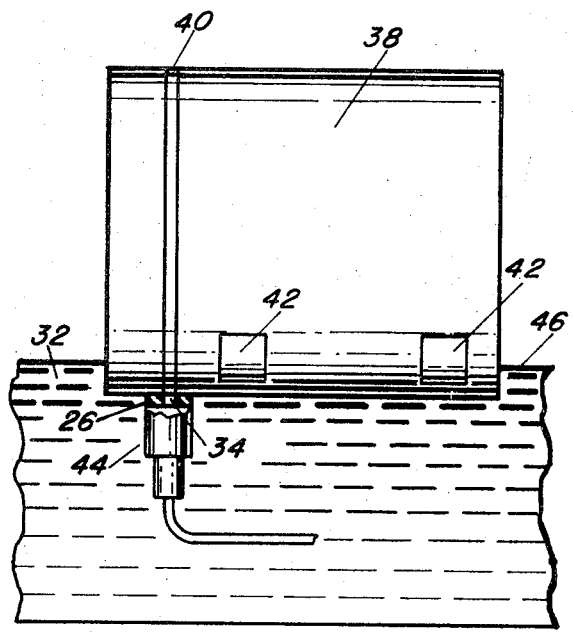
FIG. 3 is a side view of the drawing illustrated in FIG. 2 showing the relationship of the transducer to the circumferential weld width.

FIG. 3 shows a side view of the welded cylinder 38 and the rollers 42 in the liquid coupler 32 with the transducer assembly 44 having its end cap 26 and collimating bore 34 operatively disposed adjacent to weld 40 so that one rotation of the cylinder 38 will permit inspection of the complete weld width 40.

In operation the transducer assembly 44 and the material under test are submerged in a coupler, such as water, with the end cap 26 in contact with the weld. As an alternative to submerging all the items in the coupler a continuous stream of liquid is introduced into the vent 30 and allowed to flow through the assembly and out of the collimating bore 34, thereby maintaining a continuous unbroken column of liquid coupler between the transducer lens 24 and the surface of the weld 40.

The transducer assembly 44 is adjusted and focused so that the ultrasonic energy wave is on the center line of the weld being tested. If the weld is sound the reflectoscope 12 will display an interface signal 48 and first reflection signal 50. The inspection system sees a good welded area as one continuous piece of metal. In the event that there are any flaws, bubbles or cracks in the welded area an additional signal or signals will appear between the two basic signals 48 and 50. The inner surface 21 and rear end 27 of the liner 22 and end cap 26 respectively, shown in FIG. 1, absorb and attenuate nearly all the stray and unwanted beams of ultrasonic energy that are both transmitted and reflected and thus provide a narrow collimated beam of energy directly into the weld. The loss of ultrasonic energy using the aforementioned transducer assembly is more than offset by the resolution and definition obtained for the positive identification of any defects in the weld area.

The foregoing disclosure and drawings are merely illustrative of the principle of this invention and are not to be interpreted in a limiting sense. The only limitations are to be determined from the scope of the appended claims.

Having thus fully described the inventions, what is claimed as new and desured to be secured by Letters Patent of the United States is:

1. An improved transducer for an ultrasonic weld inspection system of the type wherein the system has means for electronically generating and detecting ultrasonic energy, means for positioning a transducer adjacent said weld, means for focusing said energy, and means for electrically coupling said generating and detecting means to said transducer, wherein the improvement comprises:
   a hollow cylindrical body sleeve having an open rear end slidably affixed to said transducer, a forward open end, and a sleeve vent hole in its side wall;
   a cylindrical compliant end cap, operatively disposed in said forward end, having an axially aligned collimating bore therein, said end cap absorbing and attenuating all transmitted and reflected ultrasonic energy beams not directed into said bore;
   a hollow cylindrical compliant liner, operatively disposed within said body sleeve intermediate said end cap and transducer means, having a liner vent hole in its side wall axially aligned with said sleeve vent hole, wherein said compliant liner absorbs and attenuates stray and unwanted ultrasonic energy beams; and
   a fluid coupler, operatively disposed intermediate said transducer and said end cap, for coupling ultrasonic energy generated by said generating means directly into said weld in a clean, narrow, collimated beam, said coupler providing means for returning an interface signal and a first reflection signal to said detecting means so that said interface and first reflection signals can be distinguished from any additionally returned signal that may be generated by a flaw in said weld, thereby permitting said system to reliably inspect the integrity of a lap weld seam.

2. An improved transducer as recited in claim 1 wherein said compliant liner is made of non-porous rubber.

3. An improved transducer as recited in claim 2 wherein said compliant end cap is made of non-porous rubber.

4. An improved transducer as recited in claim 3 wherein said means for focusing ultrasonic energy comprises a concave lens having a radius of curvature and focal point for directing said ultrasonic energy wave so that it is axial with said collimating bore and impinges upon said weld.

* * * * *